US008386169B2

(12) United States Patent
Nguyen

(10) Patent No.: US 8,386,169 B2
(45) Date of Patent: Feb. 26, 2013

(54) NAVIGATION SYSTEM WITH ROUTE PLANNING AND METHOD OF OPERATION THEREOF

(75) Inventor: MinhHung Canh Nguyen, San Jose, CA (US)

(73) Assignee: Telenav, Inc., Sunnyvale, CA (US)

( * ) Notice: Subject to any disclaimer, the term of this patent is extended or adjusted under 35 U.S.C. 154(b) by 244 days.

(21) Appl. No.: 12/770,580

(22) Filed: Apr. 29, 2010

(65) Prior Publication Data

US 2011/0270518 A1    Nov. 3, 2011

(51) Int. Cl.
*G01C 21/00*    (2006.01)
(52) U.S. Cl. .................... 701/423; 701/415; 701/410
(58) Field of Classification Search .......... 701/410, 701/415, 533
See application file for complete search history.

(56) References Cited

U.S. PATENT DOCUMENTS

| | | | | |
|---|---|---|---|---|
| 6,484,088 | B1 * | 11/2002 | Reimer | 701/123 |
| 7,274,374 | B2 * | 9/2007 | Ebi | 345/589 |
| 7,535,379 | B2 | 5/2009 | Suzuki | |
| 7,665,559 | B2 | 2/2010 | De La Torre-Bueno | |
| 7,860,808 | B2 * | 12/2010 | Peters | 705/500 |
| 7,893,849 | B2 * | 2/2011 | Poltorak | 340/995.19 |
| 2002/0059026 | A1 * | 5/2002 | Abe et al. | 701/301 |
| 2002/0125332 | A1 | 9/2002 | Aoki et al. | |
| 2004/0204843 | A1 * | 10/2004 | Hayama et al. | 701/209 |
| 2005/0187714 | A1 * | 8/2005 | Brulle-Drews | 702/3 |
| 2006/0238379 | A1 * | 10/2006 | Kimchi et al. | 340/995.1 |
| 2006/0278449 | A1 * | 12/2006 | Torre-Bueno | 180/65.2 |
| 2006/0287816 | A1 * | 12/2006 | Bardsley et al. | 701/209 |
| 2007/0112475 | A1 * | 5/2007 | Koebler et al. | 701/1 |
| 2007/0143011 | A1 * | 6/2007 | Sato | 701/208 |
| 2007/0156257 | A1 * | 7/2007 | Peters | 700/22 |
| 2007/0271034 | A1 | 11/2007 | Perry | |
| 2008/0133131 | A1 | 6/2008 | Poreda et al. | |
| 2009/0063045 | A1 * | 3/2009 | Figueroa et al. | 701/210 |
| 2009/0143934 | A1 * | 6/2009 | Motonaga et al. | 701/29 |
| 2009/0182463 | A1 * | 7/2009 | Maguire et al. | 701/22 |
| 2010/0010734 | A1 * | 1/2010 | Liu | 701/201 |
| 2010/0073158 | A1 * | 3/2010 | Uesaka et al. | 340/450.2 |
| 2010/0094496 | A1 * | 4/2010 | Hershkovitz et al. | 701/22 |
| 2010/0207787 | A1 * | 8/2010 | Catten et al. | 340/905 |
| 2010/0217467 | A1 * | 8/2010 | de la Torre Bueno | 701/22 |
| 2011/0050416 | A1 * | 3/2011 | Lee | 340/540 |
| 2011/0196601 | A1 * | 8/2011 | Miura et al. | 701/200 |
| 2011/0313647 | A1 * | 12/2011 | Koebler et al. | 701/123 |

OTHER PUBLICATIONS

International Search Report for Application No. PCT/US2011/033277 dated Jun. 30, 2011.

* cited by examiner

*Primary Examiner* — Helal A Algahaim
(74) *Attorney, Agent, or Firm* — Stanley Chang, Esq.

(57) ABSTRACT

A method of operation of a navigation system includes: detecting a light intensity; and selecting a route determined by the light intensity for displaying on a device.

18 Claims, 6 Drawing Sheets

NAVIGATION SYSTEM WITH ROUTE PLANNING AND METHOD OF OPERATION THEREOF

TECHNICAL FIELD

The present invention relates generally to a navigation system, and more particularly to a system for route planning.

BACKGROUND ART

Modern portable consumer and industrial electronics provide increasing levels of functionality to support modern life including location-based information services. This is especially true for client devices such as navigation systems, cellular phones, portable digital assistants, and multifunction devices.

As users adopt mobile location-based service devices, new and old usage begin to take advantage of this new device space. There are many solutions to take advantage of this new device opportunity. One existing approach is to use location information to provide navigation services, such as a global positioning service (GPS) navigation system for a mobile device.

Navigation system and service providers are continually making improvement in the user's experience in order to be competitive. In navigation services, demand for better route planning is increasingly important.

Thus, a need still remains for a navigation system with a route planning mechanism for providing a user-friendly experience and efficiency. In view of ease of use, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: detecting a light intensity; and selecting a route determined by the light intensity for displaying on a device.

The present invention provides a navigation system, including: a control unit for detecting a light intensity; and a location unit, coupled to the control unit, for selecting a route determined by the light intensity for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
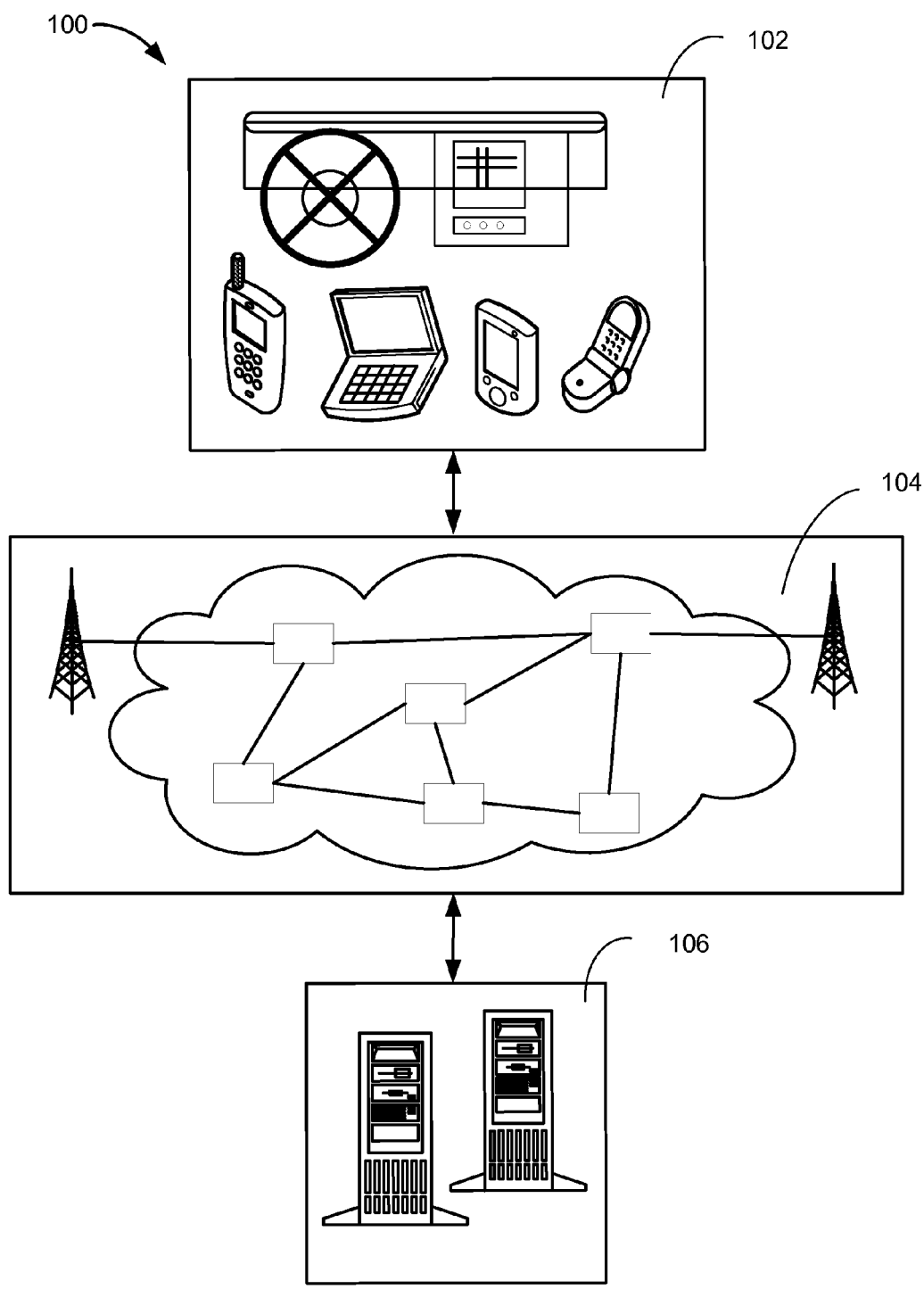
FIG. 1 is a navigation system with prediction mechanism in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with prediction mechanism in a first embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
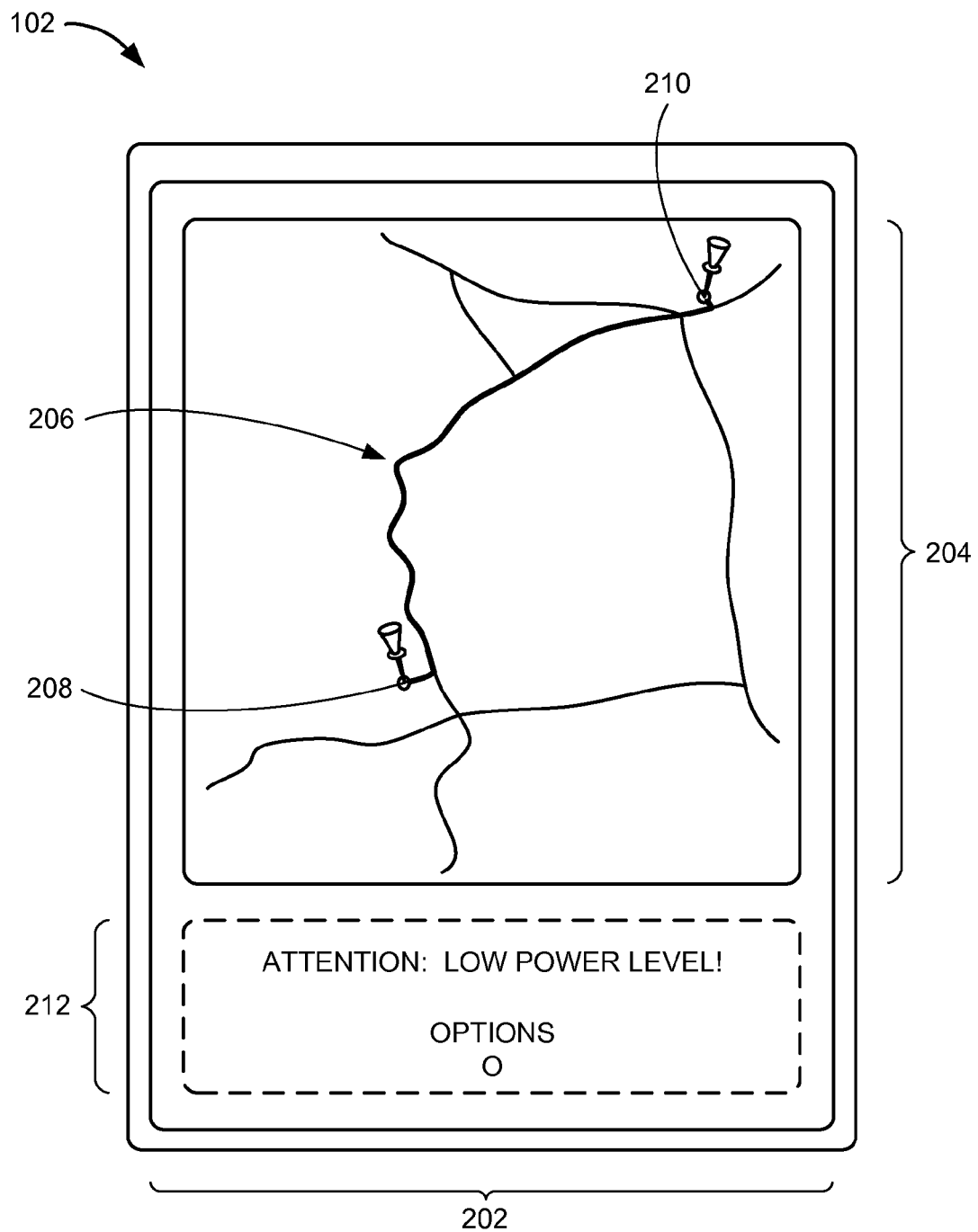
FIG. 2 is a display interface of the first device.

Referring now to FIG. 2, therein is shown a display interface 202 of the first device 102. The display interface 202 can include a display, a projector, a video screen, a speaker, or any combination thereof.

The display interface 202 can include a navigation map 204, which can include a visual presentation of an area. The navigation map 204 can also include a route 206 defined as a path for travel from at least an origin 208 or a starting point to a destination 210 or an ending point.

The display interface 202 can include a notification 212. The notification 212 can include information that is reported or presented by the navigation system 100 of FIG. 1 along the route 206.

For example, the notification 212 is shown as "ATTENTION: LOW POWER LEVEL!" to provide an alert that a current power level is low. Also for example, the display interface 202 can provide options to select a desired action. The notification 212 is shown in a textual representation, although it is understood that the notification 212 can be presented with audio, video, vibration, as examples.

Figure 3:
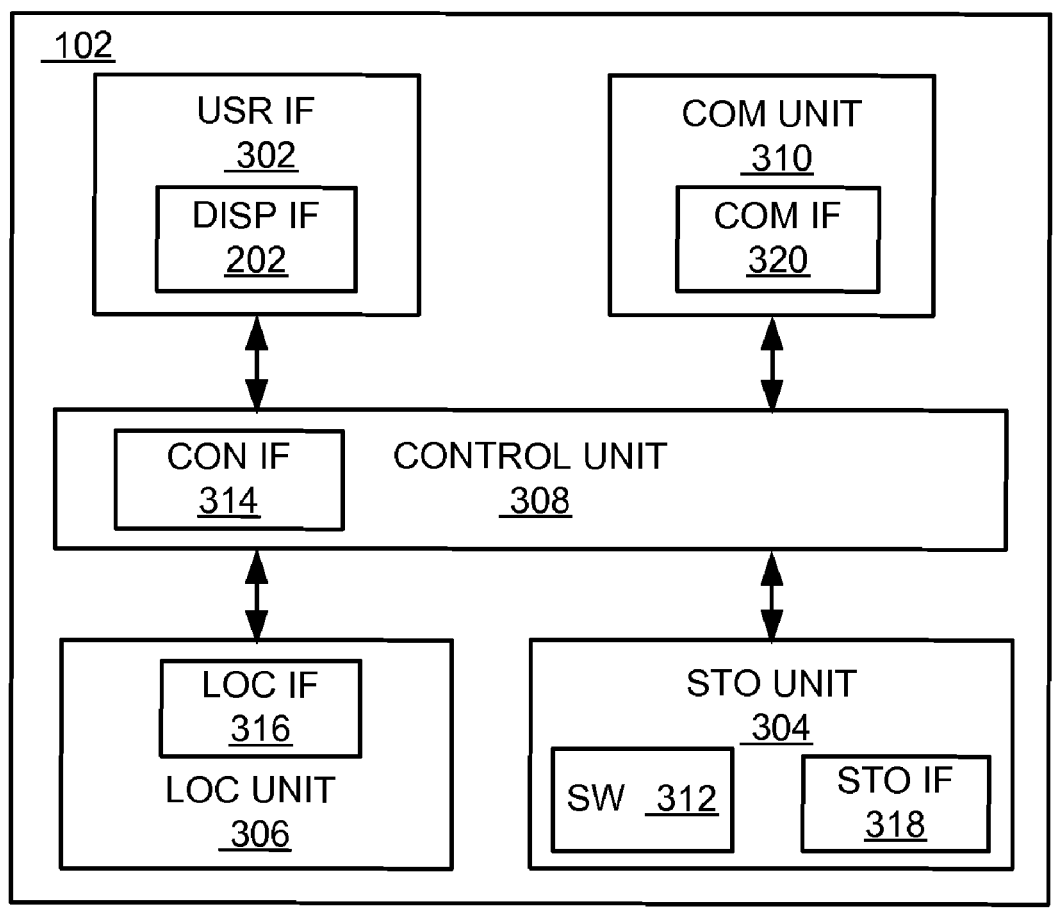
FIG. 3 is an exemplary block diagram of the first device.

Referring now to FIG. 3, therein is shown an exemplary block diagram of the first device 102. The first device 102 can include a user interface 302, a storage unit 304, a location unit 306, a control unit 308, and a communication unit 310.

The user interface 302 allows a user (not shown) to interface and interact with the first device 102. The user interface 302 can include an input device and an output device. Examples of the input device of the user interface 302 can include a keypad, a touchpad, soft-keys, a keyboard, a microphone, or any combination thereof to provide data and communication inputs. Examples of the output device of the user interface 302 can include the display interface 202. The display interface 202 can include a display, a projector, a video screen, a speaker, or any combination thereof.

The control unit 308 can execute a software 312 to provide the intelligence of the navigation system 100. The control unit 308 can operate the user interface 302 to display information generated by the navigation system 100. The control unit 308 can also execute the software 312 for the other functions of the navigation system 100, including receiving location information from the location unit 306. The control unit 308 can further execute the software 312 for interaction with the communication path 104 of FIG. 1 via the communication unit 310.

The control unit 308 can be implemented in a number of different manners. For example, the control unit 308 can be a processor, an embedded processor, a microprocessor, a hardware control logic, a hardware finite state machine (FSM), a digital signal processor (DSP), or a combination thereof.

The control unit 308 can include a controller interface 314. The controller interface 314 can be used for communication between the control unit 308 and other functional units in the first device 102. The controller interface 314 can also be used for communication that is external to the first device 102.

The controller interface 314 can receive information from the other functional units or from external sources, or can transmit information to the other functional units or to external destinations. The external sources and the external destinations refer to sources and destinations external to the first device 102.

The controller interface 314 can be implemented in different ways and can include different implementations depending on which functional units or external units are being interfaced with the controller interface 314. For example, the controller interface 314 can be implemented with a pressure sensor, an inertial sensor, a microelectromechanical system (MEMS), optical circuitry, waveguides, wireless circuitry, wireline circuitry, or a combination thereof.

The location unit 306 can generate location information, current heading, and current speed of the first device 102, as examples. The location unit 306 can be implemented in many ways. For example, the location unit 306 can function as at least a part of a global positioning system (GPS), an inertial navigation system, a cellular-tower location system, a pressure location system, or any combination thereof.

The location unit 306 can include a location interface 316. The location interface 316 can be used for communication between the location unit 306 and other functional units in the first device 102. The location interface 316 can also be used for communication that is external to the first device 102.

The location interface 316 can receive information from the other functional units or from external sources, or can transmit information to the other functional units or to external destinations. The external sources and the external destinations refer to sources and destinations external to the first device 102.

The location interface 316 can include different implementations depending on which functional units or external units are being interfaced with the location unit 306. The location interface 316 can be implemented with technologies and techniques similar to the implementation of the controller interface 314.

The storage unit 304 can store the software 312. The storage unit 304 can also store the relevant information, such as advertisements, points of interest (POI), navigation routing entries, or any combination thereof.

The storage unit 304 can be a volatile memory, a nonvolatile memory, an internal memory, an external memory, or a combination thereof. For example, the storage unit 304 can be a nonvolatile storage such as non-volatile random access memory (NVRAM), Flash memory, disk storage, or a volatile storage such as static random access memory (SRAM).

The storage unit 304 can include a storage interface 318. The storage interface 318 can be used for communication between the location unit 306 and other functional units in the first device 102. The storage interface 318 can also be used for communication that is external to the first device 102.

The storage interface 318 can receive information from the other functional units or from external sources, or can transmit information to the other functional units or to external destinations. The external sources and the external destinations refer to sources and destinations external to the first device 102.

The storage interface 318 can include different implementations depending on which functional units or external units are being interfaced with the storage unit 304. The storage interface 318 can be implemented with technologies and techniques similar to the implementation of the controller interface 314.

The communication unit 310 can enable external communication to and from the first device 102. For example, the communication unit 310 can permit the first device 102 to communicate with the second device 106 of FIG. 1, an attachment, such as a peripheral device or a computer desktop, and the communication path 104.

The communication unit 310 can also function as a communication hub allowing the first device 102 to function as part of the communication path 104 and not limited to be an end point or terminal unit to the communication path 104. The communication unit 310 can include active and passive components, such as microelectronics or an antenna, for interaction with the communication path 104.

The communication unit 310 can include a communication interface 320. The communication interface 320 can be used for communication between the communication unit 310 and other functional units in the first device 102. The communication interface 320 can receive information from the other functional units or can transmit information to the other functional units.

The communication interface 320 can include different implementations depending on which functional units are being interfaced with the communication unit 310. The communication interface 320 can be implemented with technologies and techniques similar to the implementation of the controller interface 314.

For illustrative purposes, the navigation system 100 is shown with the partition having the user interface 302, the storage unit 304, the location unit 306, the control unit 308, and the communication unit 310 although it is understood that the navigation system 100 can have a different partition. For example, the software 312 can be partitioned differently such that some or all of its function can be in the control unit 308, the location unit 306, and the communication unit 310. Also, the first device 102 can include other functional units not shown in FIG. 3 for clarity.

The functional units in the first device 102 can work individually and independently of the other functional units. The first device 102 can work individually and independently from the second device 106 and the communication path 104.

Figure 4:
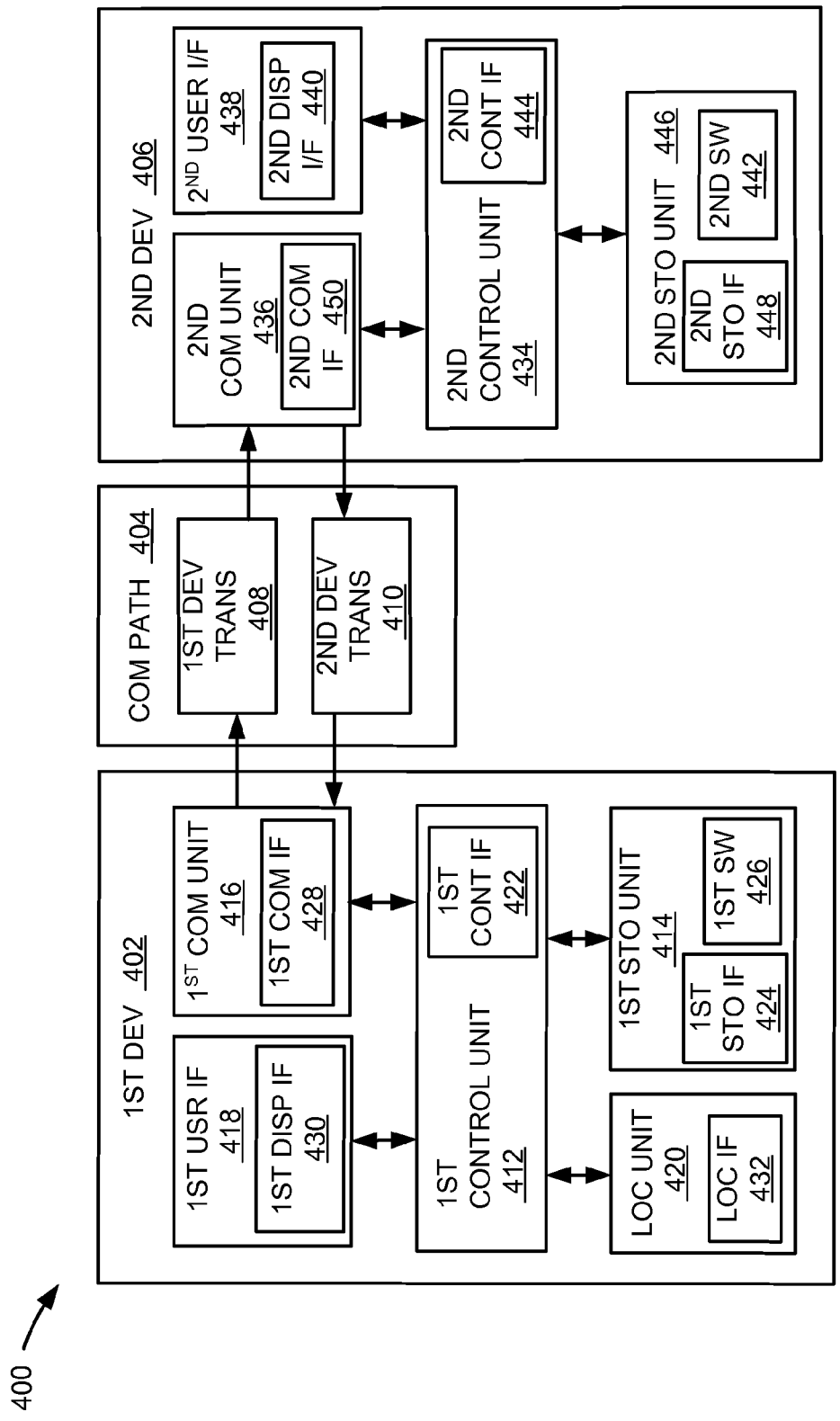
FIG. 4 is an exemplary block diagram of a navigation system with prediction mechanism in a second embodiment of the present invention.

Referring now to FIG. 4, therein is shown an exemplary block diagram of a navigation system 400 with prediction mechanism in a second embodiment of the present invention. The navigation system 400 can include a first device 402, a communication path 404, and a second device 406.

The first device 402 can communicate with the second device 406 over the communication path 404. For example, the first device 402, the communication path 404, and the second device 406 can be the first device 102 of FIG. 1, the communication path 104 of FIG. 1, and the second device 106 of FIG. 1, respectively. The screen shot shown on the display interface 202 described in FIG. 2 can represent the screen shot for the navigation system 400.

The first device 402 can send information in a first device transmission 408 over the communication path 404 to the second device 406. The second device 406 can send information in a second device transmission 410 over the communication path 404 to the first device 402.

For illustrative purposes, the navigation system 400 is shown with the first device 402 as a client device, although it is understood that the navigation system 400 can have the first device 402 as a different type of device. For example, the first device 402 can be a server.

Also for illustrative purposes, the navigation system 400 is shown with the second device 406 as a server, although it is understood that the navigation system 400 can have the second device 406 as a different type of device. For example, the second device 406 can be a client device.

For brevity of description in this embodiment of the present invention, the first device 402 will be described as a client device and the second device 406 will be described as a server device. The present invention is not limited to this selection for the type of devices. The selection is an example of the present invention.

The first device 402 can include a first control unit 412, a first storage unit 414, a first communication unit 416, a first user interface 418, and a location unit 420. The first device 402 can be similarly described by the first device 102.

The first control unit 412 can include a first controller interface 422. The first control unit 412 and the first controller interface 422 can be similarly described as the control unit 308 of FIG. 3 and the controller interface 314 of FIG. 3, respectively.

The first storage unit 414 can include a first storage interface 424. The first storage unit 414 and the first storage interface 424 can be similarly described as the storage unit 304 of FIG. 3 and the storage interface 318 of FIG. 3, respectively. A first software 426 can be stored in the first storage unit 414.

The first communication unit 416 can include a first communication interface 428. The first communication unit 416 and the first communication interface 428 can be similarly described as the communication unit 310 of FIG. 3 and the communication interface 320 of FIG. 3, respectively.

The first user interface 418 can include a first display interface 430. The first user interface 418 and the first display interface 430 can be similarly described as the user interface 302 of FIG. 3 and the display interface 202 of FIG. 3, respectively.

The location unit 420 can include a location interface 432. The location unit 420 and the location interface 432 can be similarly described as the location unit 306 of FIG. 3 and the location interface 316 of FIG. 3, respectively.

The performance, architectures, and type of technologies can also differ between the first device 102 and the first device 402. For example, the first device 102 can function as a single device embodiment of the present invention and can have a higher performance than the first device 402. The first device 402 can be similarly optimized for a multiple device embodiment of the present invention.

For example, the first device 102 can have a higher performance with increased processing power in the control unit 308 compared to the first control unit 412. The storage unit 304 can provide higher storage capacity and access time compared to the first storage unit 414.

Also for example, the first device 402 can be optimized to provide increased communication performance in the first communication unit 416 compared to the communication unit 310. The first storage unit 414 can be sized smaller compared to the storage unit 304. The first software 426 can be smaller than the software 312 of FIG. 3.

The second device 406 can be optimized for implementing the present invention in a multiple device embodiment with the first device 402. The second device 406 can provide the additional or higher performance processing power compared to the first device 402. The second device 406 can include a second control unit 434, a second communication unit 436, and a second user interface 438.

The second user interface 438 allows a user (not shown) to interface and interact with the second device 406. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 400. The second software 442 can operate in conjunction with the first software 426. The second control unit 434 can provide additional performance compared to the first control unit 412 or the control unit 308.

The second control unit 434 can operate the second user interface 438 to display information. The second control unit 434 can also execute the second software 442 for the other functions of the navigation system 400, including operating the second communication unit 436 to communicate with the first device 402 over the communication path 404.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 406. The second controller interface 444 can also be used for communication that is external to the second device 406.

The second controller interface 444 can receive information from the other functional units or from external sources, or can transmit information to the other functional units or to external destinations. The external sources and the external destinations refer to sources and destinations external to the second device 406.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 400 is shown with the second storage unit 446 as a single hierarchy storage system, although it is understood that the navigation system 400 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 306 and other functional units in the second device 406. The second storage interface 448 can also be used for communication that is external to the second device 406.

The second storage interface 448 can receive information from the other functional units or from external sources, or can transmit information to the other functional units or to external destinations. The external sources and the external destinations refer to sources and destinations external to the second device 406.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 406. For example, the second communication unit 436 can permit the second device 406 to communicate with the first device 402 over the communication path 404.

The second communication unit 436 can also function as a communication hub allowing the second device 406 to function as part of the communication path 404 and not limited to be an end point or terminal unit to the communication path 404. The second communication unit 436 can include active and passive components, such as microelectronics or an antenna, for interaction with the communication path 404.

The second communication unit 436 can include a second communication interface 450. The second communication interface 450 can be used for communication between the second communication unit 436 and other functional units in the second device 406. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 404 to send information to the second device 406 in the first device transmission 408. The second device 406 can receive information in the second communication unit 436 from the first device transmission 408 of the communication path 404.

The second communication unit 436 can couple with the communication path 404 to send information to the first device 402 in the second device transmission 410. The first device 402 can receive information in the first communication unit 416 from the second device transmission 410 of the communication path 404. The navigation system 400 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 406 can include other functional units not shown in FIG. 4 for clarity.

The functional units in the first device 402 can work individually and independently of the other functional units. The first device 402 can work individually and independently from the second device 406 and the communication path 404.

The functional units in the second device 406 can work individually and independently of the other functional units. The second device 406 can work individually and independently from the first device 402 and the communication path 404.

For illustrative purposes, the navigation system 400 is described by operation of the first device 402 and the second device 406. It is understood that the first device 402 and the second device 406 can operate any of the modules and functions of the navigation system 400. For example, the first device 402 is described to operate the location unit 420, although it is understood that the second device 406 can also operate the location unit 420.

Figure 5:
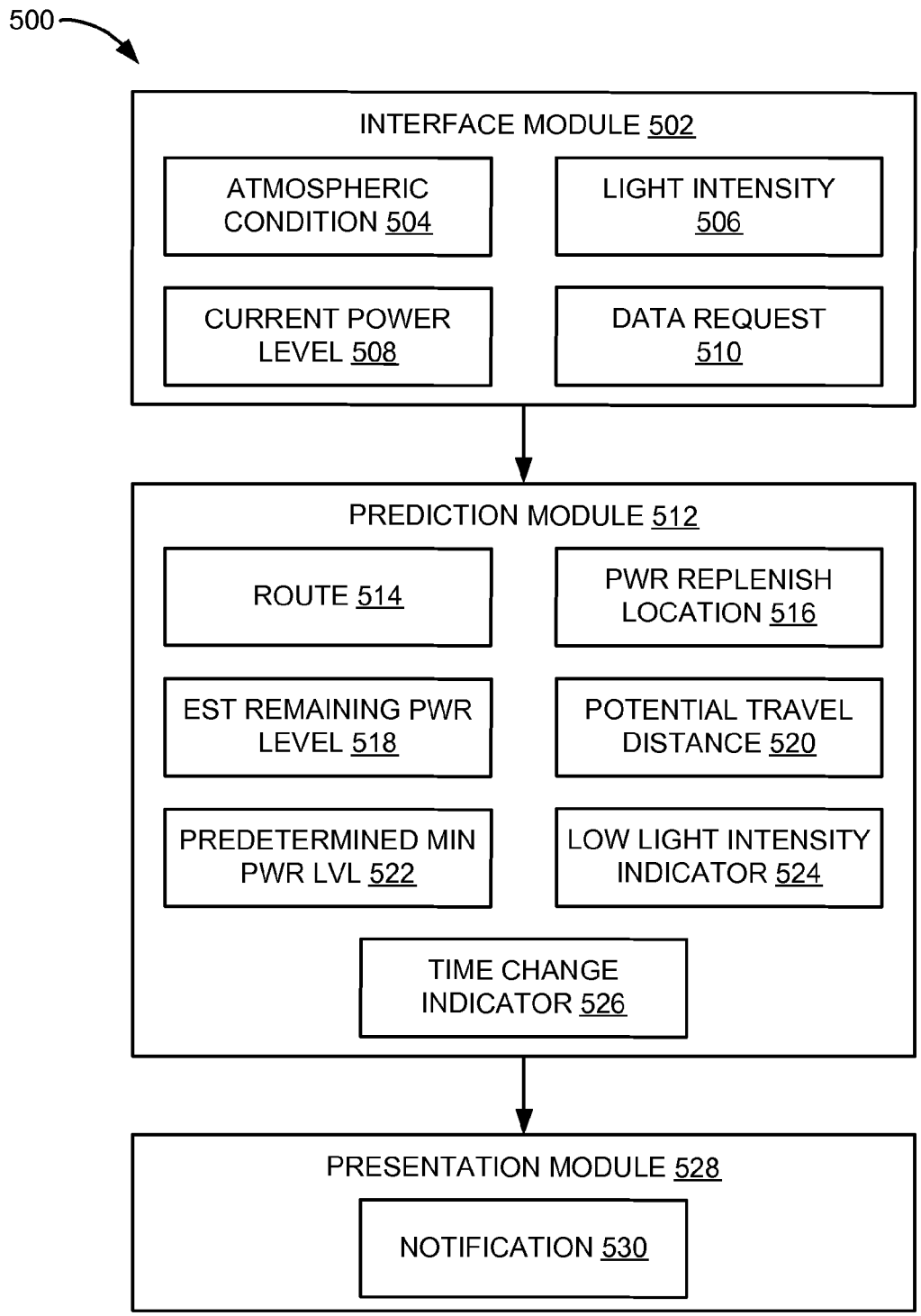
FIG. 5 is a navigation system with prediction mechanism in a third embodiment of the present invention.

Referring now to FIG. 5, therein is shown a navigation system 500 with prediction mechanism in a third embodiment of the present invention. The navigation system 500 can include an interface module 502, which can provide an ability to obtain relevant information for navigation or route planning purposes.

The interface module 502 can communicate or interact with another device to obtain the relevant information. The relevant information can be provided by a third-party provider.

The relevant information can include an atmospheric condition 504, which can include a state of an atmosphere or an environment. The atmospheric condition 504 can be obtained based on temperature, wind, cloud covers, precipitation, solar radiation, sun tracking, light exposure, prediction of rains, or weather forecast.

For example, the atmospheric condition 504 can include a current temperature or a predicted temperature. Also for example, the atmospheric condition 504 can be obtained based on a relative humidity or a barometric reading.

The atmospheric condition 504 can include information about a light intensity 506 defined as a measurement of electromagnetic radiation. The light intensity 506 can include a measurement of light, which can include sunlight or light from a street light, a lamppost, a street lamp, a light pole, or a lamp standard.

The light intensity 506 can be a function of solar radiation from the sun or radiation of lights on one or both sides of streets or roads. The light intensity 506 can be measured or detected with a radiation sensor, a spectrophotometer, or a photometer.

The interface module 502 can receive a current power level 508 defined as a measured level of power from a power supply or an energy source. For example, the current power level 508 can include a voltage measurement of a battery, which can be charged by a system including a solar panel and a charging circuit.

The current power level 508 can be manually input. The current power level 508 can be provided via a direct link or a communication path between the interface module 502 and a power supply module.

The interface module 502 can send a data request 510 to another device to make an inquiry for information. The data request 510 can be sent to request for the atmospheric condition 504 based on the current power level 508.

For example, when the current power level 508 is below a predetermined level, the interface module 502 can request for an update of the atmospheric condition 504. Also for example, the interface module 502 can request for the atmospheric condition 504 based on a change in weather or traffic conditions.

The interface module 502 can be implemented with the navigation system 400 of FIG. 4. For example, the interface module 502 can be implemented with the first control unit 412 of FIG. 4, the first storage unit 414 of FIG. 4 having the first storage interface 424 of FIG. 4 and the first software 426 of FIG. 4, the first communication unit 416 of FIG. 4, the first user interface 418 of FIG. 4, the communication path 404 of FIG. 4, the second control unit 434 of FIG. 4, the second communication unit 436 of FIG. 4, the second user interface 438 of FIG. 4, the second storage unit 446 of FIG. 4 having the second storage interface 448 of FIG. 4 and the second software 442 of FIG. 4, or a combination thereof.

The navigation system 500 can include a prediction module 512, which can functions for planning or estimating a route 514. The route 514 can be represented by the route 206 of FIG. 2. The prediction module 512 can be coupled to or interfaced with the interface module 502.

The prediction module 512 can determine the route 514 based on the light intensity 506. The prediction module 512 can select the route 514 that is associated with the light intensity 506 having the highest number of lumens. For example, the route 514 that is selected can include one of the routes with a lot of sunlight or traffic lights to provide an ability to go green by reducing gas or fuel consumption.

The prediction module 512 can identify a power replenishment location 516 along the route 514. The power replenishment location 516 can include a waypoint at which a power supply or an energy source can be recharged, restored, or refilled.

The prediction module 512 can calculate an estimated remaining power level 518 to indicate an amount of power that is left when the destination 210 of FIG. 2 is reached. The estimated remaining power level 518 can be determined based on estimation factors that affect a power supply. For example, the estimation factors can include estimated power consumption, the current power level 508, estimated charging power as a function of the light intensity 506, an average travel distance in a given amount of power, a distance to the destination 210, or a combination thereof.

The prediction module 512 can estimate a potential travel distance 520 that can be travelled until a power supply is empty. The potential travel distance 520 can be estimated based on calculation parameters. For example, the calculation parameters can include the estimated power consumption, the current power level 508, the estimated charging power as a function of the light intensity 506, the average travel distance in a given amount of power, or a combination thereof. The prediction module 512 can indicate if a distance to the power replenishment location 516 is longer than the potential travel distance 520.

Before a trip begins, the prediction module 512 can estimate and compare the potential travel distance 520 to a travel distance of the route 514. For example, the prediction module 512 can predict if there is a sufficient amount of power to make a trip on the route 514.

The prediction module 512 can compare a predetermined minimum power level 522 to the current power level 508. The prediction module 512 can enable a trigger to alert that the current power level 508 is below the predetermined minimum power level 522.

The predetermined minimum power level 522 can be configured or preset. The prediction module 512 can be configured to update or re-select the route 514 if the distance to the power replenishment location 516 is longer than the potential travel distance 520 or the current power level 508 is below the predetermined minimum power level 522.

The current power level 508 below the predetermined minimum power level 522 can indicate a low level of battery charge. When the current power level 508 is below the predetermined minimum power level 522 or the potential travel distance 520 is shorter than a remaining travel distance from the current location to the destination 210, the route 514 can be re-generated or re-selected to include a path from the current location to the power replenishment location 516. The trip can be resumed from the power replenishment location 516 to the destination 210.

The prediction module 512 can be configured to re-select or re-calculate the route 514 based on a low light intensity indicator 524, which can identify that the light intensity 506 is decreasing below a predetermined level. The low light intensity indicator 524 can provide detection of the light intensity 506 at a level that it not sufficient to generate an adequate electrical power for charging a power supply.

The prediction module 512 can re-select or re-calculate the route 514 based on a time change indicator 526 defined as an identification that a travel time is at a preset time. For example, the time change indicator 526 can provide detection of the travel time at an estimated time of sunset or at night.

The prediction module 512 can re-select the route 514 when the distance to the power replenishment location 516 is longer than the potential travel distance 520. For example, the route 514 can be re-selected when the current location is too far from a gas station, a charging station, or an electric recharging point.

The route 514 that is selected can be required to be associated with a sufficient level of the light intensity 506. For example, the sufficient level of the light intensity 506 can provide a capability for a vehicle having its energy or battery refreshed or recharged.

The prediction module 512 can select or re-select the route 514 with past or historical data. For example, the past data can include an average mileage of past trips.

The route 514 can be selected based on time. For example, the route 514 can be selected depending on rush hours, carpool times, or commute hours.

The route 514 can be selected depending on the day of the week. For example, the route 514 can be selected based on work days, weekends, or holidays.

The prediction module 512 can be implemented with the navigation system 400 of FIG. 4. For example, the prediction module 512 can be implemented with the first control unit 412 of FIG. 4, the first storage unit 414 of FIG. 4 having the first storage interface 424 of FIG. 4 and the first software 426 of FIG. 4, the first communication unit 416 of FIG. 4, the first user interface 418 of FIG. 4, the location unit 420 of FIG. 4, the communication path 404 of FIG. 4, the second control unit 434 of FIG. 4, the second communication unit 436 of FIG. 4, the second user interface 438 of FIG. 4, the second storage unit 446 of FIG. 4 having the second storage interface 448 of FIG. 4 and the second software 442 of FIG. 4, or a combination thereof.

The navigation system 500 can include a presentation module 528 to present or display information or messages for travel. The presentation module 528 can be coupled to or interfaced with the prediction module 512.

The prediction module 512 can enable the presentation module 528 to present a notification 530, which can include an alert, a warning, or an informational message. The notification 530 can be represented by the notification 212 of FIG. 2. The presentation module 528 can display the route 514 on a device.

The presentation module 528 can be enabled to present the notification 530 based on the light intensity. For example, the notification 530 can be presented to indicate that the low light intensity indicator 524 is identified by the prediction module 512. Also for example, the notification 530 can be presented to indicate that the time change indicator 526 is identified.

For example, if the potential travel distance 520 is shorter than the distance from the current location to the power replenishment location 516, the presentation module 528 can present the notification 530. Also for example, the presentation module 528 can be instructed by the prediction module 512 to present the notification 530 when the current power level 508 is below the predetermined minimum power level 522.

The presentation module 528 can be implemented with the navigation system 400 of FIG. 4. For example, the presentation module 528 can be implemented with the first control unit 412 of FIG. 4, the first storage unit 414 of FIG. 4 having the first storage interface 424 of FIG. 4 and the first software 426 of FIG. 4, the first communication unit 416 of FIG. 4, the first user interface 418 of FIG. 4, the communication path 404 of FIG. 4, the second control unit 434 of FIG. 4, the second communication unit 436 of FIG. 4, the second user interface 438 of FIG. 4, the second storage unit 446 of FIG. 4 having the second storage interface 448 of FIG. 4 and the second software 442 of FIG. 4, or a combination thereof.

It has been discovered that the route 514 determined by the light intensity 506 provides significant energy efficiency. The light intensity 506 is efficiently used to effectively recharge the power supply for a continuous travel.

It has also been discovered that the route 514 is eco-friendly. The route 514 greatly improves the environment by reducing consumption of fuel for travelers, thereby eliminating pollution.

The physical transformation of data of the atmospheric condition 504, the light intensity 506, and the current power level 508 to the route 514 and the notification 530 results in movement in the physical world, such as people using the first device 402 of FIG. 4, the second device 406 of FIG. 4, or vehicles, based on the operation of the navigation system 500. As the movement in the physical world occurs, the movement itself creates additional information that is converted back to the data for further processing with the atmospheric condition 504, the light intensity 506, and the current power level 508 for the continued operation of the navigation system 500 and to continue the movement in the physical world.

Thus, it has been discovered that the navigation system 500 of the present invention furnishes important and heretofore unknown and unavailable solutions, capabilities, and functional aspects for providing energy efficiency and eco-friendliness.

The navigation system 500 describes the module functions or order as an example. The modules can be partitioned differently. For example, the prediction module 512 is shown as a single module, although the prediction module 512 can be implemented in multiple modules. Each of the modules can operate individually and independently of the other modules.

Figure 6:
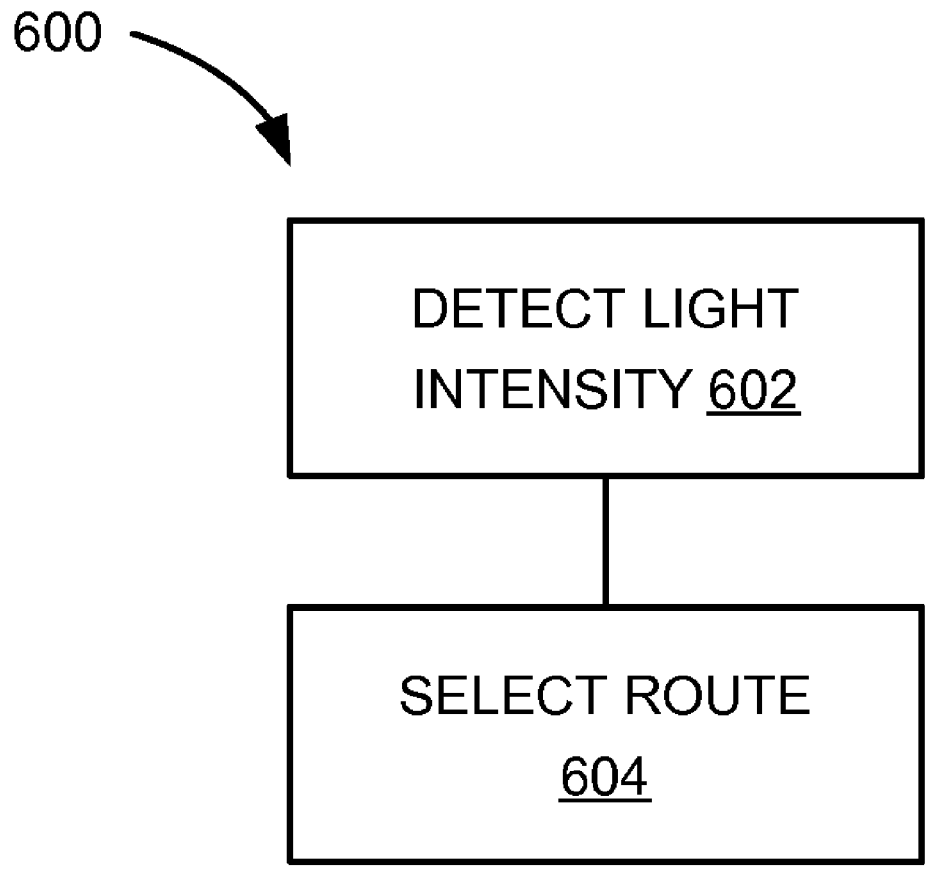
FIG. 6 is a flow chart of a method of operation of a navigation system in a further embodiment of the present invention.

Referring now to FIG. 6, therein is shown a flow chart of a method 600 of operation of a navigation system in a further embodiment of the present invention. The method 600 includes: detecting a light intensity in a block 602; and selecting a route determined by the light intensity for displaying on a device in a block 604.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    detecting with a control unit a light intensity as a measurement of electromagnetic radiation;
    selecting a route determined by the light intensity for displaying on a device; and calculating an estimated remaining power level with the light intensity.

2. The method as claimed in claim 1 further comprising sending a data request for the light intensity.

3. The method as claimed in claim 1 further comprising estimating a potential travel distance with the light intensity.

4. The method as claimed in claim 1 further comprising presenting a notification based on the light intensity.

5. A method of operation of a navigation system comprising:
    receiving a current power level;
    detecting with a control unit a light intensity as a measurement of electromagnetic radiation based on the current power level; selecting a route determined by the light intensity for displaying on a device; and
    calculating an estimated remaining power level with the light intensity.

6. The method as claimed in claim 5 further comprising comparing a predetermined minimum power level to the current power level.

7. The method as claimed in claim 5 further comprising identifying a power replenishment location along the route.

8. The method as claimed in claim 5 further comprising recalculating the route based on a low light intensity indicator.

9. The method as claimed in claim 5 further comprising recalculating the route based on a time change indicator.

10. A navigation system comprising:
    a control unit for detecting a light intensity as a measurement of electromagnetic radiation;
    a location unit, coupled to the control unit, for selecting a route determined by the light intensity for displaying on a device; and a prediction module, coupled to the location unit, for calculating an estimated remaining power level with the light intensity.

11. The system as claimed in claim 10 further comprising a user interface, coupled to the location unit, for sending a data request for the light intensity.

12. The system as claimed in claim 10 wherein the control unit is for estimating a potential travel distance with the light intensity.

13. The system as claimed in claim 10 further comprising a user interface, coupled to the location unit, for presenting a notification based on the light intensity.

14. The system as claimed in claim 10 further comprising a user interface, coupled to the location unit, for receiving a current power level, the light intensity based on the current power level.

15. The system as claimed in claim 14 wherein the control unit is for comparing a predetermined minimum power level to the current power level.

16. The system as claimed in claim 14 wherein the control unit is for identifying a power replenishment location along the route.

17. The system as claimed in claim 14 wherein the control unit is for re-calculating the route based on a low light intensity indicator.

18. The system as claimed in claim 14 wherein the control unit is for re-calculating the route based on a time change indicator.

* * * * *